(12) United States Patent
Katou et al.

(10) Patent No.: US 6,572,095 B1
(45) Date of Patent: Jun. 3, 2003

(54) METHOD OF AND SYSTEM FOR CONVEYING SHEET TO BE SCANNED

(75) Inventors: Hirokazu Katou, Kaisei-machi (JP); Katsuaki Muraishi, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/655,763

(22) Filed: Sep. 5, 2000

(30) Foreign Application Priority Data

| Sep. 3, 1999 | (JP) | ............................................ 11-250447 |
| Sep. 3, 1999 | (JP) | ............................................ 11-250448 |
| Sep. 3, 1999 | (JP) | ............................................ 11-250449 |

(51) Int. Cl.⁷ ............................................ B65H 5/22
(52) U.S. Cl. ............................ 271/3.22; 271/276; 355/76; 346/138
(58) Field of Search ............................ 271/276, 3.22; 355/73, 76; 399/379; 346/138, 134–137; 269/21

(56) References Cited

U.S. PATENT DOCUMENTS

| 4,258,264 A | 3/1981 | Kotera et al. ............ 250/484 |
| 4,346,295 A | 8/1982 | Tanaka et al. ........... 250/327.2 |
| 4,485,302 A | 11/1984 | Tanaka et al. ........... 250/327.2 |
| 4,705,952 A | 11/1987 | Lindmayer ............... 250/484.1 |
| 4,806,772 A | 2/1989 | Lindmayer ............... 250/484.1 |
| 4,812,659 A | 3/1989 | Lindmayer ............... 250/484.1 |
| 4,812,660 A | 3/1989 | Lindmayer ............... 250/484.1 |
| 4,822,520 A | 4/1989 | Lindmayer ............... 252/301.4 |
| 4,830,875 A | 5/1989 | Lindmayer .................. 427/69 |
| 4,839,092 A | 6/1989 | Lindmayer ............... 252/301.4 |
| 4,842,960 A | 6/1989 | Lindmayer .................. 428/690 |
| 4,855,603 A | 8/1989 | Lindmayer ............... 250/484.1 |
| 4,864,536 A | 9/1989 | Lindmayer .................. 365/119 |
| 4,865,967 A | 9/1989 | Shiraishi et al. ............... 435/6 |
| 4,879,186 A | 11/1989 | Lindmayer .................. 428/691 |
| 4,915,982 A | 4/1990 | Lindmayer .................... 427/64 |
| 4,983,834 A | 1/1991 | Lindmayer et al. ...... 250/327.2 |
| 4,992,302 A | 2/1991 | Lindmayer .................... 427/70 |
| 5,006,366 A | 4/1991 | Lindmayer .................... 427/71 |
| 5,007,037 A | 4/1991 | Lindmayer .................. 369/100 |
| 5,012,098 A | 4/1991 | Lindmayer .................. 250/339 |
| 5,028,793 A | 7/1991 | Lindmayer et al. ...... 250/484.1 |
| 5,043,097 A | 8/1991 | Lindmayer ............... 252/301.4 |
| 5,099,277 A * | 3/1992 | Lucht et al. .................. 355/73 |
| 5,124,558 A | 6/1992 | Soltani et al. ............ 250/484.1 |
| 5,260,190 A | 11/1993 | Shiraishi et al. ............... 436/94 |
| 5,270,162 A | 12/1993 | Shiraishi et al. ............... 435/6 |
| 5,276,465 A * | 1/1994 | Menard et al. ............... 346/134 |
| 5,488,906 A * | 2/1996 | Iron et al. ................... 346/138 |
| 5,636,833 A * | 6/1997 | Maier et al. ................. 271/276 |
| 5,852,464 A * | 12/1998 | Hebert et al. ............... 347/215 |
| 6,133,936 A * | 10/2000 | Blake et al. ................. 346/138 |
| 6,254,091 B1 * | 7/2001 | Hebert et al. ............... 271/276 |

FOREIGN PATENT DOCUMENTS

| JP | 55-12429 | 1/1980 | ............ G01T/1/10 |
| JP | 56-11395 | 2/1981 | ............ G21K/4/00 |
| JP | 56-11397 | 2/1981 | ............ G21K/4/00 |
| JP | 64-60782 | 3/1989 | ............ F04B/39/00 |
| JP | 64-60784 | 3/1989 | ............ F04B/39/00 |
| JP | 3-205550 | 9/1991 | ......... G01N/27/447 |
| JP | 4-3952 | 1/1992 | ............ H01L/21/66 |
| JP | 4-232864 | 8/1992 | ............ G01N/33/58 |

* cited by examiner

Primary Examiner—Christopher P. Ellis
Assistant Examiner—Mark A. Deuble
(74) Attorney, Agent, or Firm—Sughrue Mion, PLLC

(57) ABSTRACT

A sheet to be scanned is conveyed to a sheet holding device provided with a support member having an arcuate and concave sheet holding surface and a sheet holding mechanism for holding the sheet on the sheet holding surface in which the sheet is conveyed along the sheet holding surface in its circumferential direction and is positioned in a predetermined position on the sheet holding surface. Air is blown into between the sheet holding surface and the sheet when the sheet is conveyed to and out of the sheet holding device through an air blow hole formed in the sheet holding surface.

13 Claims, 8 Drawing Sheets

RELATED ART

METHOD OF AND SYSTEM FOR CONVEYING SHEET TO BE SCANNED

BACKGROUND OF THE INVENTION

1. Field of the Invention

This invention relates to a method of and a system for conveying a sheet to be scanned to an arcuate concave surface of a sheet holding device, such a sheet holding device, and a method of holding the sheet.

2. Description of the Related Art

When certain kinds of phosphors are exposed to a radiation such as X-rays, α-rays, β-rays, γ-rays, cathode rays or ultraviolet rays, they store a part of the radiation. Then when the phosphor which has been exposed to the radiation is exposed to stimulating rays such as visible light, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been known a radiation image recording and reproducing system in which a sheet provided with a layer of the stimulable phosphor (will be referred to as "a stimulable phosphor sheet", hereinbelow) is first exposed to a radiation passing through an object to have a radiation image of the object stored on the stimulable phosphor sheet, a stimulating light beam such as a laser beam is caused to scan the stimulable phosphor sheet so that the stimulable phosphor sheet emits stimulated emission as signal light bearing thereon information on the radiation image, the stimulated emission is photoelectrically detected, thereby obtaining an image signal (a radiation image signal), and the radiation image of the object is reproduced as a visible image on the basis of the image signal on a recording medium such as a photographic film or a display such as a CRT. See, for instance, Japanese Unexamined Patent Publication Nos. 55(1980)-12429, 56(1981)11395 and 56(1981)-11397, and Japanese Patent Publication No. 1(1989)-60784.

There has been known an autoradiography using the principle of the radiation image recording and reproducing system in which an organism such as a rat is administered with a radioactive marker substance, a sample of a tissue of the organism is kept on the stimulable phosphor layer of the stimulable phosphor sheet for a predetermined time to have the stimulable phosphor absorb radiation energy radiated from the sample, a stimulating light beam is caused to scan the stimulable phosphor sheet so that the stimulable phosphor sheet emits stimulated emission, the stimulated emission is photoelectrically detected to form a digital image signal, a predetermined signal processing is carried out on the digital image signal, and a visible image is reproduced on the basis of the processed digital image signal on a recording medium such as a photographic film or a display such as a CRT, thereby obtaining information on the distribution of the radioactive marker substance in the sample. See, for instance, Japanese Patent Publication Nos. 1(1989)-60784, 1(1989)-60782 and 4(1992)-3952.

Further, there has been proposed a chemiluminescence detecting system in which a high polymer fixed with its protein sequence, nucleic acid sequence and the like is selectively labeled with a marker substance which causes a chemiluminescence substance to emit chemiluminescence upon contact therewith, the high polymer selectively labeled with the marker substance is brought into contact with a chemiluminescence substance, the stimulable phosphor of the stimulable phosphor sheet is caused to store the energy of the chemiluminescence in a visible wavelength range emitted upon contact of the marker substance with the chemiluminescence substance, an electromagnetic beam is caused to scan the stimulable phosphor sheet so that the stimulable phosphor sheet emits stimulated emission, the stimulated emission is photoelectrically detected to form a digital image signal, a predetermined signal processing is carried out on the digital image signal, and a visible image is reproduced on the basis of the processed digital image signal on a recording medium such as a photographic film or a display such as a CRT, thereby obtaining information on the high polymer such as genetic information. See, for instance, Japanese Unexamined Patent Publication Nos. 3(1991)-205550 and 4(1992)-232864.

These systems includes an image read-out apparatus having a stimulating beam scanning device for scanning the stimulable phosphor sheet with a stimulating beam or the like. The stimulating beam scanning device generally comprises, as shown in FIG. 2A, a sheet holding device 20 which holds a stimulable phosphor sheet 10 on a sheet holding surface 23a, which is an arcuate concave surface, and is movable in the direction of arrow Y parallel to the generatrix of the sheet holding surface 23a, a stimulating light source 40, a photoelectric conversion means 50 such as a photomultiplier which outputs an electric signal S according to the amount of light received and a spinner (a main scanning means) 30 which is rotated in the direction of arrow X by an electric motor (not shown) about a central axis Y0 of curvature of the arcuate sheet holding surface 23a while projecting a beam L of stimulating light emitted from the stimulating light source 40 onto the stimulable phosphor sheet 10 held on the sheet holding surface 23a through a lens 31 provided on a part of its peripheral wall, collecting stimulated emission M emitted from the stimulable phosphor sheet 10 upon stimulation by the stimulating light beam L, and causing the collected stimulated emission M to impinge upon the photoelectric conversion means 50.

As shown in more detail in FIG. 2B, the spinner 30 is provided therein a mirror 32 which reflects the stimulating light beam L, which is emitted from the stimulating light source 40 and reflected by a mirror 41 and a dichroic mirror 42 to enter the spinner 30 along the central axis Y0, toward a condenser lens 31 provided on the peripheral surface of the spinner 30. The mirror 32 also reflects the stimulated emission M, which is emitted from the stimulable phosphor sheet 10 and collected by the condenser lens 31, toward the photoelectric conversion means 50 along the central axis Y0.

Conventionally, the stimulable phosphor sheet 10 is conveyed to the sheet holding surface 23a of the sheet holding device 20 of the image read-out apparatus, for instance, by a sheet conveying system shown in FIGS. 4A and 4B which are views as seen in the direction of arrow A in FIG. 2A.

The sheet conveying system shown in FIGS. 4A and 4B comprises conveyor rollers 21 and 22 which convey the stimulable phosphor sheet 10 along the sheet holding surface 23a in the circumferential direction, a leading end detecting means which is formed by a lever 24 urged by a spring 24a and a sensor 26 and detects that the leading end 10a of the stimulable phosphor sheet 10 reaches a predetermined position where it abuts against a stopper 23b, and a sheet positioning means 25 which positions the stimulable phosphor sheet 10 in place on the sheet holding surface 23a by positioning the trailing end 10b of the stimulable phosphor sheet 10 in response to detection of the leading end 10a by the leading end detecting means. That is, when the leading end 10b of the stimulable phosphor sheet 10 is brought into abutment against one end portion of the lever 24 and moves upward the lever 24 overcoming the force of the spring 24a, the lever 24 is rotated in the clockwise direction to the stopper 23b as shown in FIG. 4B. The sensor 26 is normally detecting the distance to the other end portion of the lever 24 and the sensor 26 detects that the leading end 10a of the stimulable phosphor sheet 10 reaches the stopper 23 through the distance to the other end portion of the lever 24. Then the sensor 26 informs a control means 27 of the fact that it has detected that the leading end 10a of the stimulable phosphor sheet 10 reaches the stopper 23, and, upon receipt of the information, the control means 27 stops the conveyor rollers 21 and 22 and rotates the trailing end positioning means 25 to push the trailing end 10b of the stimulable phosphor sheet 10 and position the trailing end 10b as shown in FIG. 4B.

After the leading end 10a and the trailing end 10b of the stimulable phosphor sheet 10 are thus positioned, the stimulable phosphor sheet 10 is sucked against the sheet holding surface 23a through a plurality of suction holes 23c formed in the sheet holding surface 23a and thus held on the sheet holding device 20 and then the conveyor rollers 21 and 22 are retracted from the sheet holding surface 23a. In this state, the image on the stimulable phosphor sheet 10 is read out by operating the spinner 30.

In such a sheet conveying system, there has been a problem that the sheet driving force is reduced by dynamic friction acting between the sheet holding surface 23a and the surface of the stimulable phosphor sheet. Since the dynamic friction increases as the contact area between the sheet holding surface 23a and the stimulable phosphor sheet 10 increases, the sheet driving force required to convey the stimulable phosphor sheet 10 along the sheet holding surface 23a is increased as the size of the stimulable phosphor sheet 10 increases.

Further, in the sheet holding device, there has been a problem that, though the suction holes 23c should be as many as possible in order to stably and uniformly hold the sheet to be scanned on the sheet holding surface 23a, forming many suction holes 23a by machining is a labor-consuming process and adds to the manufacturing cost.

Further, in the sheet holding device, there has been also a problem that air is sometimes trapped between the stimulable phosphor sheet 10 and the sheet holding surface 23a between suction holes arranged in the circumferential direction of the sheet holding surface 23a. When air is trapped between the stimulable phosphor sheet 10 and the sheet holding surface 23a, the part of the stimulable phosphor sheet 10 can be held away from the sheet holding surface 23a, which results in fluctuation in distance between the surface of the stimulable phosphor sheet 10 and the spinner 30. The distance between the surface of the stimulable phosphor sheet 10 and the spinner 30 is reduced at the part where the stimulable phosphor sheet 10 is held away from the sheet holding surface 23a and the detected intensity of the stimulated emission M is unreasonably increased, whereby accuracy in reading the image is deteriorated.

SUMMARY OF THE INVENTION

In view of the foregoing observations and description, the primary object of the present invention is to provide a method of and a system for conveying a sheet to be scanned such as a stimulable phosphor sheet to and out of an arcuate and concave sheet holding surface which can convey the sheet to be scanned with a relatively small driving force.

Another object of the present invention is to provide a sheet holding device for holding a sheet to be scanned on an arcuate and concave sheet holding surface which can stably and uniformly hold the sheet on the sheet holding surface with a relatively small number of suction holes.

Still another object of the present invention is to provide a method of and a device for holding a sheet to be scanned on an arcuate and concave sheet holding surface which can hold the sheet in a close contact with the sheet holding surface over the entire area thereof without any part held away from the sheet holding surface.

In the method of and the system for conveying a sheet to be scanned in accordance with the present invention, the dynamic friction acting between the sheet holding surface and the surface of the stimulable phosphor sheet by blowing air or the like through an air blow hole formed in the sheet holding surface so that an air layer is formed at least a part of the interface between the sheet and the sheet holding surface and the contact area between the sheet and the sheet holding surface is reduced when the sheet is to be conveyed to or out of the sheet holding surface.

That is, in accordance with a first aspect of the present invention, there is provided a method of conveying a sheet to be scanned to a sheet holding device provided with a support member having an arcuate and concave sheet holding surface and a sheet holding means for holding the sheet on the sheet holding surface in which the sheet is conveyed along the sheet holding surface in a circumferential direction thereof and is positioned in a predetermined position on the sheet holding surface, wherein the improvement comprises the step of, blowing gas between the sheet holding surface and the sheet when the sheet is conveyed to and out of the sheet holding device through a gas blow hole formed in the sheet holding surface.

Generally the arcuate and concave sheet holding surface is a part of the inner surface of a cylinder. For example, the sheet may be conveyed by the use of conveyor rollers. Further, the sheet holding means may comprise, for instance, a magnetic means which magnetically holds the sheet on the sheet holding surface or a suction means which holds the sheet on the sheet holding surface under vacuum supplied through a plurality of suction holes formed in the sheet holding surface.

It is preferred that the sheet conveying means such as conveyer rollers be provided not only in a position from which the sheet is conveyed in the sheet holding surface (will be referred to as "the sheet-in position", hereinbelow) but also in a position between the sheet-in position and a position where the leading end of the sheet is finally positioned (will be referred to as "the leading end holding position", hereinbelow), whereby the sheet driving force is enhanced and the sheet can be conveyed in and out of the sheet holding device more smoothly coupled with the effect of the gas blown between the sheet holding surface and the sheet. Especially, this is useful in the case of a read-out apparatus where a sheet longer than the conventional sheet in a length in the direction of conveyance is used and accordingly the dynamic friction acting between the sheet and the sheet holding surface is larger.

In accordance with a second aspect of the present invention, there is provided a system for carrying out the method in accordance with the first aspect of the present invention, that is, a system for conveying a sheet to be scanned to a sheet holding device provided with a support member having an arcuate and concave sheet holding surface and a sheet holding means for holding the sheet on the sheet holding surface, the system comprising conveyor means for conveying the sheet along the sheet holding surface in a circumferential direction thereof and a positioning means for positioning the sheet in a predetermined position on the sheet holding surface, wherein the improvement comprises a gas blow hole formed in the sheet holding surface and
a gas blow means which blows gas between the sheet holding surface and the sheet when the sheet is conveyed to and out of the sheet holding device through the gas blow hole.

In accordance with the first and second aspects of the present invention, a gas layer (typically an air layer) is formed between the sheet and the sheet holding surface and the friction between the sheet and the sheet holding surface is weakened, whereby the sheet can be conveyed with relatively small sheet driving force.

In accordance with a third aspect of the present invention, there is provided a sheet holding device comprising a support member having an arcuate and concave sheet holding surface provided with a suction hole and a suction means which supplies suction force through the suction hole to hold the sheet on the sheet holding surface under vacuum, wherein the improvement comprises that at least one groove is formed in the sheet holding surface and the suction hole is formed in the groove.

The term "groove" as used here need not be limited to express an elongated groove but should be broadly interpreted to express a recess larger than opening of the suction hole like a seat.

In the case where the sheet is conveyed along the sheet holding surface in a circumferential direction thereof, it is preferred that the groove has no outer edge extending in a direction perpendicular to the circumferential direction of the sheet holding surface. That is, when the sheet is conveyed in the sheet holding surface, the sheet is arcuately bent under normal drag from the arcuate sheet holding surface. However, since the sheet tends to be restored under its resiliency, there is fear that, when there is a groove having an outer edge extending in a direction perpendicular to the circumferential direction of the sheet holding surface, the leading end of the sheet can interfere with the wall of the groove to obstruct smooth conveyance of the sheet. For example, the groove may be X-shaped.

In accordance with the third aspect of the present invention, since suction force can be applied to the sheet through the opening of the groove, the sheet can be stably and uniformly sucked against the sheet holding surface through a relatively small number of suction holes.

In accordance with a fourth aspect of the present invention, there is provided a method of holding a sheet to be scanned, which is conveyed along an arcuate and concave sheet holding surface of a support member in a circumferential direction thereof from one edge of the sheet holding surface toward the other edge thereof, on the sheet holding surface under suction force applied to the sheet through a plurality of suction holes formed in the sheet holding surface, wherein the improvement comprises the steps of forming a plurality of suction holes in different positions in the circumferential direction of the sheet holding surface between said one edge of the sheet holding surface and the other edge thereof and supplying suction force to the suction holes in sequence from the suction hole nearest to said the other edge of the sheet holding surface to the suction hole nearest to said one edge of the same.

Generally the arcuate and concave sheet holding surface is a part of the inner surface of a cylinder. For example, the sheet may be conveyed by the use of conveyor rollers.

Further, suction force may be applied to the suction holes by, for instance, a suction pump.

In the case where the sheet is conveyed along the sheet holding surface with air blown between the sheet and the sheet holding surface, the method in accordance with the fourth aspect of the present invention is especially useful. In this case, an air layer is more apt to be trapped between the sheet and the sheet holding surface.

In accordance with a fifth aspect of the present invention, there is provided a device for holding a sheet to be scanned, which is conveyed along an arcuate and concave sheet holding surface of a support member in a circumferential direction thereof from one edge of the sheet holding surface toward the other edge thereof, on the sheet holding surface under suction force applied to the sheet through a plurality of suction holes formed in the sheet holding surface, wherein the improvement comprises a plurality of suction holes formed in different positions in the circumferential direction of the sheet holding surface between said one edge of the sheet holding surface and the other edge thereof and
a suction means which supplies suction force to the suction holes in sequence from the suction hole nearest to said the other edge of the sheet holding surface to the suction hole nearest to said one edge of the same.

In accordance with the fourth and fifth aspects of the present invention, since the sheet is attracted to the sheet holding surface from the leading end thereof toward the trailing end thereof, air between the sheet and the sheet holding surface is gradually pushed toward the trailing end of the sheet and purged through the sides and/or the trailing edge of the sheet, whereby the sheet can be held in a close contact with the sheet holding surface over the entire area thereof without any part held away from the sheet holding surface.

DESCRIPTION OF THE PREFERRED EMBODIMENTS

Figure 1A:
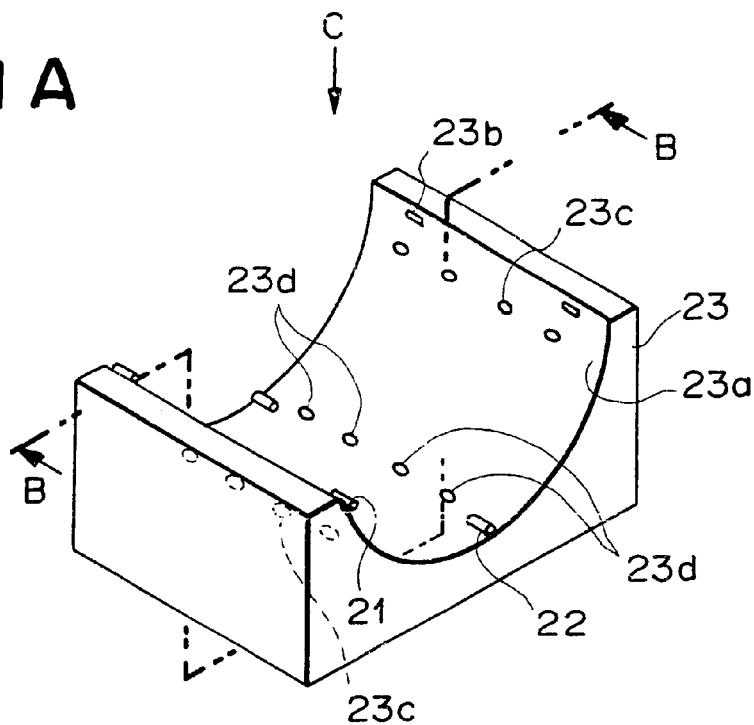
FIG. 1A is a perspective view for illustrating a sheet conveying system in accordance with a first embodiment of the present invention.
Figure 1B:
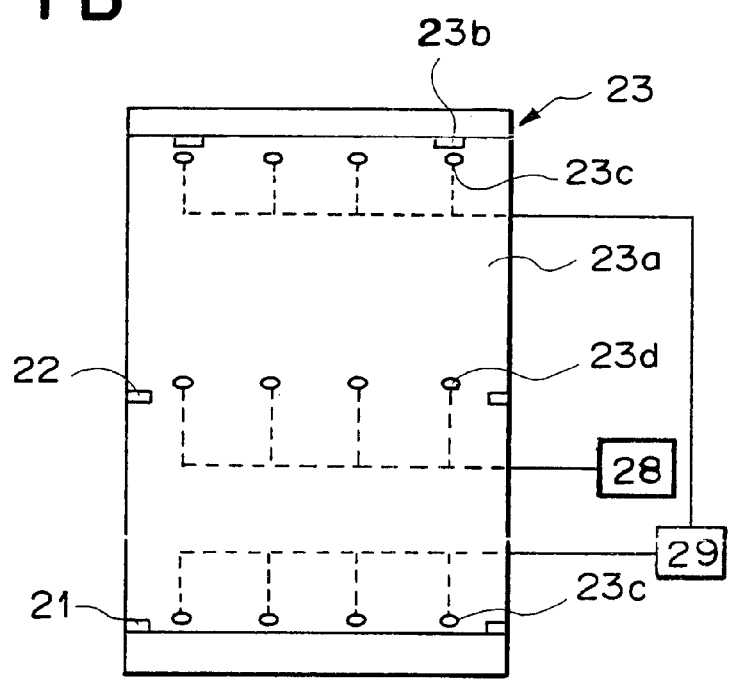
FIG. 1B is a view as seen in the direction of arrow C in FIG. 1A, FIGS. 2A and 2B are views showing an example of an image read-out apparatus in which the sheet conveying system of the first embodiment is employed.
Figure 2A:
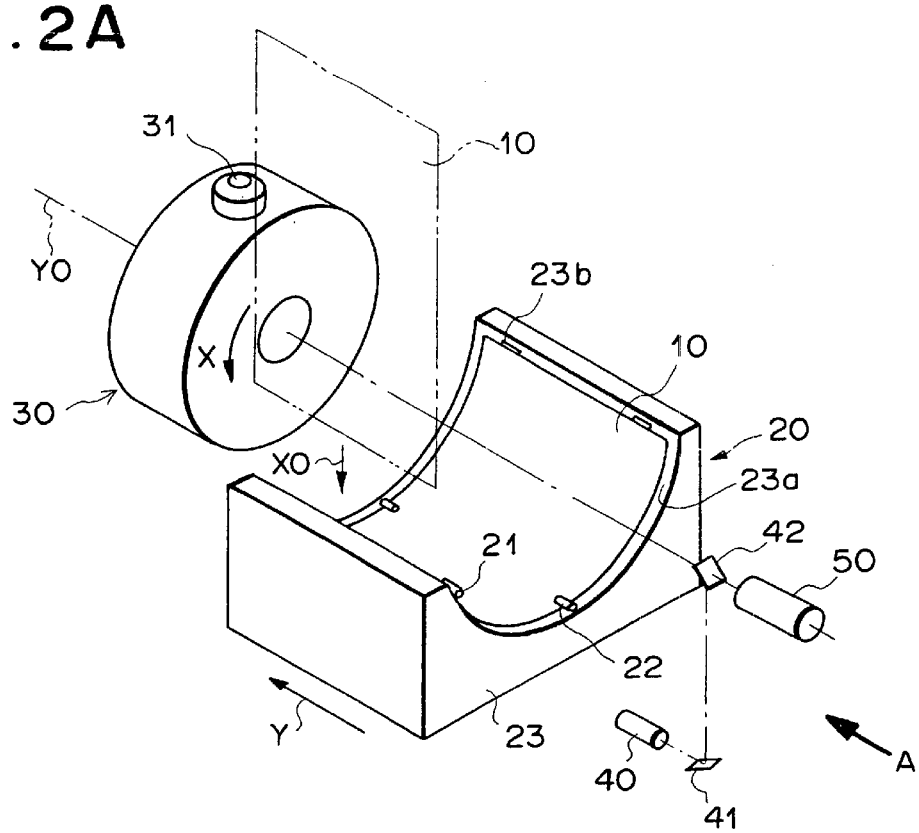

FIGS. 1A and 1B show a sheet conveying system in accordance with a first embodiment of the present invention. The sheet conveying system is employed, for instance, in an image read-out apparatus shown in FIGS. 2A and 2B. As shown in FIG. 2A, the image read-out apparatus comprises a sheet holding device 20 which holds a stimulable phosphor sheet 10 on a sheet holding surface 23a, which is an arcuate concave surface, and is movable in the direction of arrow Y parallel to the generatrix of the sheet holding surface 23a, a stimulating light source 40 which emits a laser beam L stimulating stimulable phosphor of a stimulable phosphor sheet 10, a photomultiplier 50 which outputs an electric signal S according to the amount of light received, and a spinner 30 which is rotated in the direction of arrow X by an electric motor (not shown) about a central axis Y0 of curvature of the arcuate sheet holding surface 23a while projecting a laser beam L emitted from the stimulating light source 40 onto the stimulable phosphor sheet 10 held on the sheet holding surface 23a through a lens 31 provided on a part of its peripheral wall, collecting stimulated emission M emitted from the stimulable phosphor sheet 10 upon stimulation by the laser beam L, and causing the collected stimulated emission M to impinge upon the photomultiplier 50.

Figure 2B:
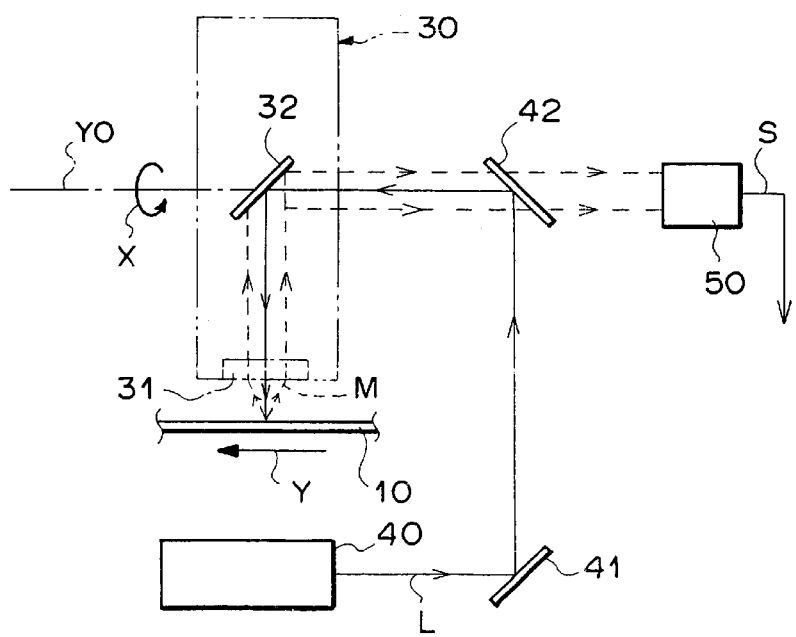

As shown in more detail in FIG. 2B, the spinner 30 is provided therein a mirror 32 which reflects the laser beam L, which is emitted from the stimulating light source 40 and reflected by a mirror 41 and a dichroic mirror 42 to enter the spinner 30 along the central axis Y0, toward the condenser lens 31 provided on the peripheral surface of the spinner 30. The mirror 32 also reflects the stimulated emission M, which is emitted from the stimulable phosphor sheet 10 and collected by the condenser lens 31, toward the photomultiplier 50 along the central axis Y0. With this arrangement, the laser beam L is caused by the spinner 30 to scan the stimulable phosphor sheet 10 held on the sheet holding surface 23a at a constant speed in the circumferential direction of the holding surface 23a (main scanning), and stimulated emission M emitted from the stimulable phosphor sheet 10 upon stimulation by the laser beam L is detected by the photomultiplier 50.

Further, since the sheet holding device 20 is moved in the direction of arrow Y (sub-scanning), the laser beam L is caused to scan substantially over the entire surface of the stimulable phosphor sheet 10 and radiation image information which has been stored on the stimulable phosphor sheet 10 as a distribution of radiation energy thereon is read out.

As shown in FIGS. 1A and 1B in more detail, the sheet holding device 20 comprises a platen 23 which has said sheet holding surface 23a and a plurality of suction holes 23c and air blow holes 23d formed in the sheet holding surface 23a, and a suction pump 29 (sheet holding means) which applies suction force to the suction holes 23c.

The sheet conveying system of this embodiment is for conveying the stimulable phosphor sheet 10 to and out of the sheet holding surface 23a, and comprises, as shown in FIGS. 1A and 1B, conveyor rollers 21 and 22 which convey the stimulable phosphor sheet 10 along the sheet holding surface 23a in the circumferential direction thereof, an air blow means 28 which blows, through the air blow holes 23d, air between the sheet holding surface 23a and the sheet 10 when the sheet 10 is conveyed to and out of the sheet holding device 20, and a sheet positioning means 25 which positions the stimulable phosphor sheet 10 in place on the sheet holding surface 23a.

The sheet positioning means 25 comprises (see also FIGS. 3A to 3C) a leading end detecting lever 24 which is disposed near a stopper 23b disposed near the upper edge of the sheet holding surface 23a and is urged in the counterclockwise direction by a spring 24a, a leading end sensor (photosensor) 26 which optically detects rotation of the lever 24, a trailing end pressing lever 25 which presses the trailing end 10b of the stimulable phosphor sheet 10 toward the sheet holding surface 23a and positions the trailing end 10b in place on the sheet holding surface 23a, and a controller 27 which stops the conveyor rollers 21 and 22 and the air blow means 28 and activates the trailing end pressing lever 25 to start positioning of the trailing end 10b upon detection of the leading end 10a by the leading end sensor 26. The stopper 23b is disposed in a position where the distance from the opposite edge of the sheet holding surface 23a as measured along the sheet holding surface 23a is slightly (by about several millimeters) smaller than the length of the sheet 10 in the direction of conveyance.

Figure 3A:
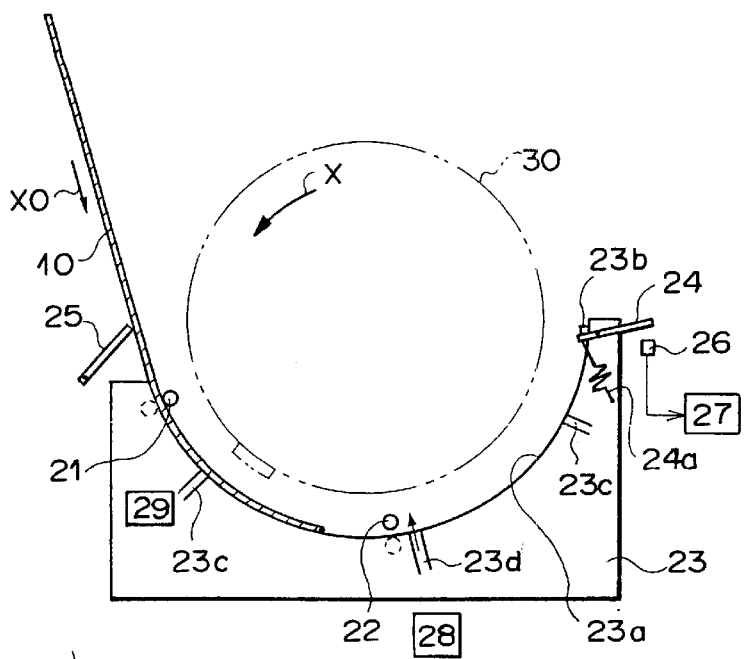
FIGS. 3A to 3C are views taken along line B—B in FIG. 1B for illustrating the operation of the sheet conveying system of the first embodiment.

Operation of the sheet conveying system of this embodiment will be described with reference to FIGS. 3A to 3C, which are cross-sectional views taken along line B—B in FIG. 1, hereinbelow.

The conveyor rollers 21 disposed near one edge of the sheet holding surface 23a are rotated to convey the stimulable phosphor sheet 10 in the platen 23 along the sheet holding surface 23a. At the same time, air is blown toward the central axis Y0 through the air blow holes 23d by the air blow means 28 in response to rotation of the conveyor rollers 21. (FIG. 3A)

Figure 3B:
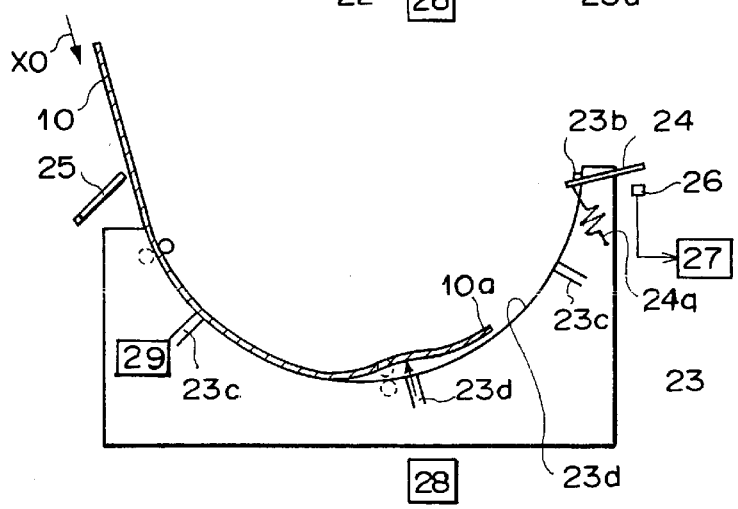

As the stimulable phosphor sheet 10 is conveyed in the platen 23 and the leading end of the sheet 10 reaches the middle of the sheet holding surface 23a, the conveyor rollers 22 are driven in addition to the conveyor rollers 21, whereby the sheet driving force is enhanced, and at the same time, an air layer is formed between the sheet 10 and the sheet holding surface 23a by the air blow through the air blow holes 23d as shown in FIG. 3B, whereby the contact area between the sheet 10 and the sheet holding surface 23a is reduced and the dynamic friction therebetween is reduced. As a result, the sheet 10 can be smoothly conveyed into the platen 23.

The sheet 10 is further conveyed into the platen 23 by the conveyor rollers 21 and 22, and air is kept blown through the air blow holes 23d, whereby the sheet 10 can be smoothly conveyed along the sheet holding surface 23a.

Figure 3C:
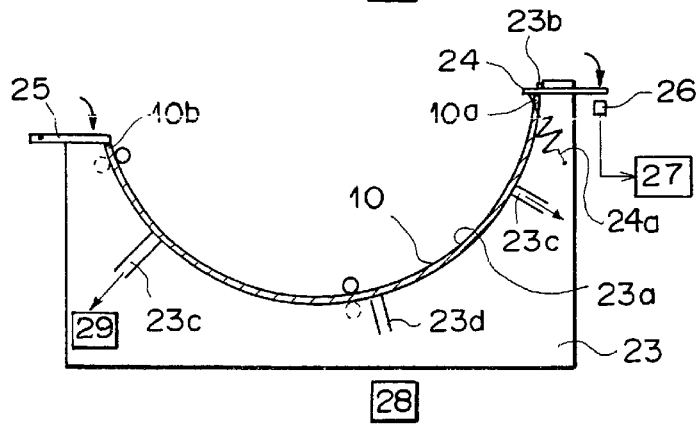
Figure 4A:
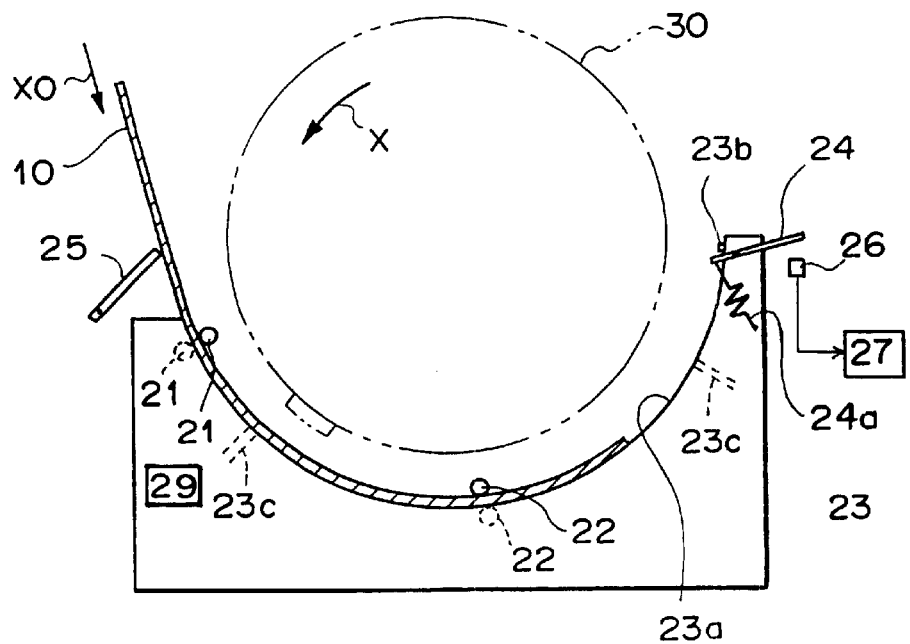
FIGS. 4A to 4B are views for illustrating a problem in the conventional sheet conveying system.
Figure 4B:
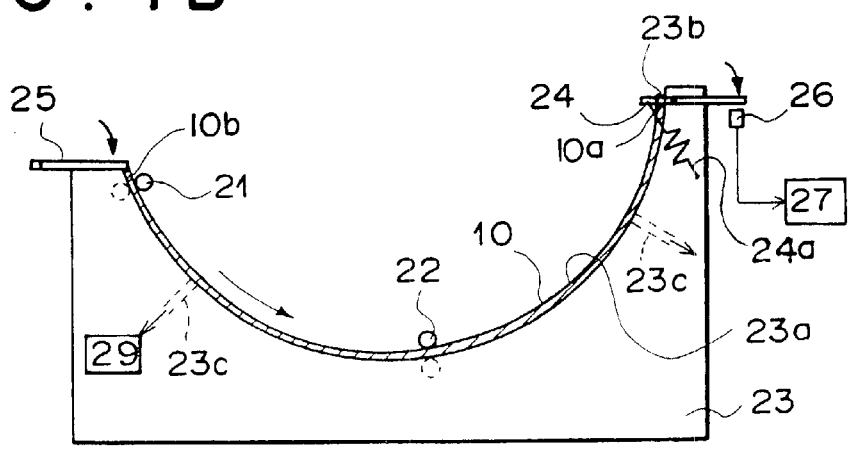

When the leading end 10a of the sheet 10 is conveyed to the stopper 23b, the leading end detecting lever 24 is rotated in the clockwise direction overcoming the force of the spring 24a pushed by the leading end 10a of the sheet 10, whereby the other end portion of the lever 24 is moved toward the sensor 26 as shown in FIG. 3C. Thus, the sensor 26 detects that the leading end 10a of the sheet 10 passes a predetermined position on the sheet holding surface 23a and informs the controller 27 of the fact.

Upon receipt of the information, the controller 27 stops the conveyor rollers 21 and 22 and the air blow means 28. As a result, the sheet 10 is stopped on the sheet holding surface 23a. In this state, the trailing end 10b of the sheet 10 projects from the rear edge of the sheet holding surface 23a by a small length (about several millimeters). Then the controller 27 rotates the trailing end pressing lever 25 in the direction of the arrow, whereby the lever 25 abuts against the trailing end 10b of the sheet 10 and pushes the sheet 10 further into the platen 23.

The trailing end pressing lever 25 is stopped on the rear edge of the sheet holding surface 23a. In this state, the controller 27 drives the suction pump 29 and the sheet 10 is attracted against the sheet holding surface 23a and held there under vacuum supplied through the suction holes 23c.

After the stimulable phosphor sheet 10 is thus held on the sheet holding device 20, the conveyor rollers 21 and 22 are retracted from the sheet holding surface 23a. In this state, the radiation image stored on the stimulable phosphor sheet 10 is read out by operating the spinner 30.

As can be understood from the description above, in the sheet conveying system of this embodiment, an air layer is formed between the sheet 10 and the sheet holding surface 23a by air blown through the air blow holes 23d and the friction between the sheet 10 and the sheet holding surface 23a is weakened, whereby the sheet 10 can be conveyed with relatively small sheet driving force.

Though, in the sheet conveying system of this embodiment, conveyor rollers 22 is provided in addition to conveyor rollers 21 provided near the sheet inlet side edge of the sheet holding surface 23a, the sheet 10 may be conveyed by various sheet conveying mechanisms. However, by virtue of the additional conveyor rollers 22, the sheet driving force is enhanced and the sheet 10 can be prevented from floating from the sheet holding surface 23a under its resiliency.

Figure 5A:
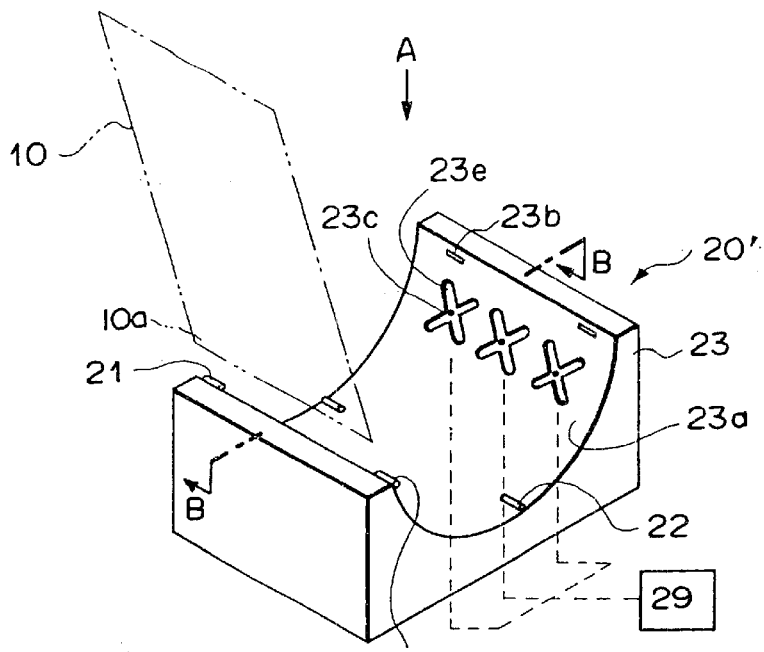
FIG. 5A is a perspective view showing a modification of the sheet holding device.
Figure 5B:
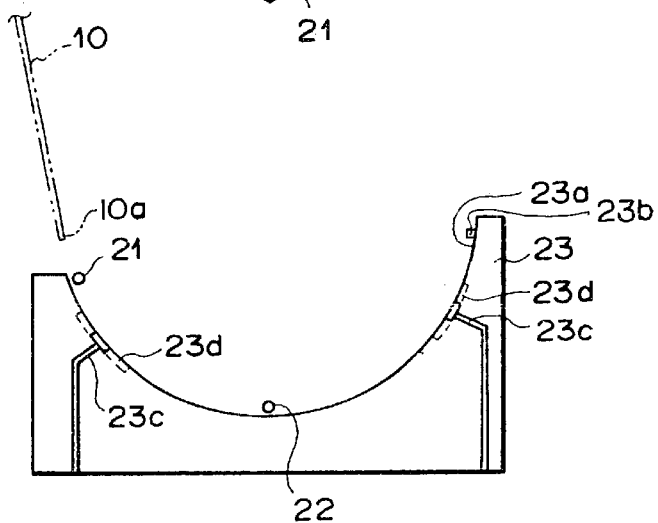
FIG. 5B is a cross-sectional view taken along line B—B in FIG. 5A.
Figure 5C:
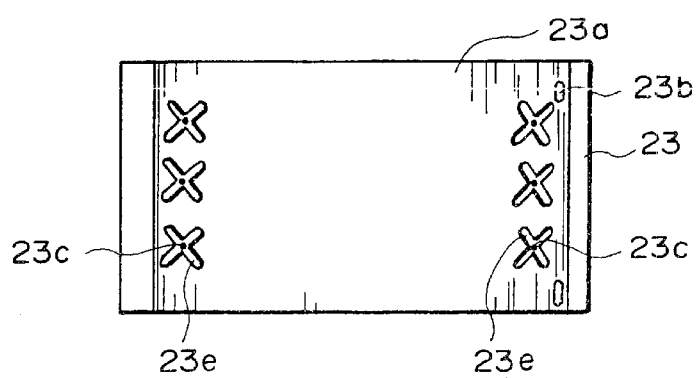
FIG. 5C is a plan view as seen in the direction of arrow A in FIG. 5A, FIGS. 6A and 6B are views respectively showing modifications of the recess employed in the sheet holding device shown in FIG. 5A.

FIGS. 5A to 5C show a preferred modification of the sheet holding device. The sheet holding device 20' of this modification is substantially the same as the sheet holding device 20 of the first embodiment and accordingly the analogous elements are given the same reference numerals and will not be described here. The sheet holding device 20' of this modification differs from the sheet holding device 20 of the first embodiment in that the suction holes 23c are formed in X-shaped recesses 23e.

When the suction pump 29 is operated with the sheet 10 is positioned on the sheet holding surface 23a, air in the recesses 23e covered with the sheet 10 is evacuated through the suction holes 23c in the recesses 23e and the pressure in the recesses 23e becomes lower than the atmospheric pressure, whereby the sheet 10 is attracted against the sheet holding surface 23a under vacuum and held there.

In the sheet holding device 20' of this modification, since suction force can be applied to the sheet through the opening of the recesses 23e, the sheet 10 can be stably and uniformly sucked against the sheet holding surface 23a through a relatively small number of suction holes 23c.

Figure 6A:
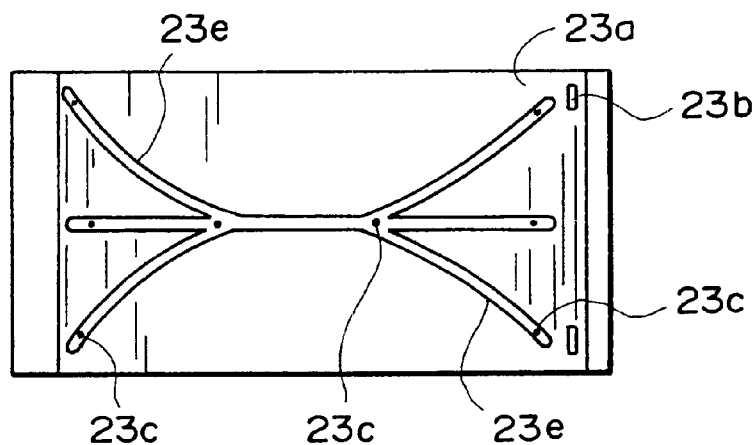
Figure 6B:
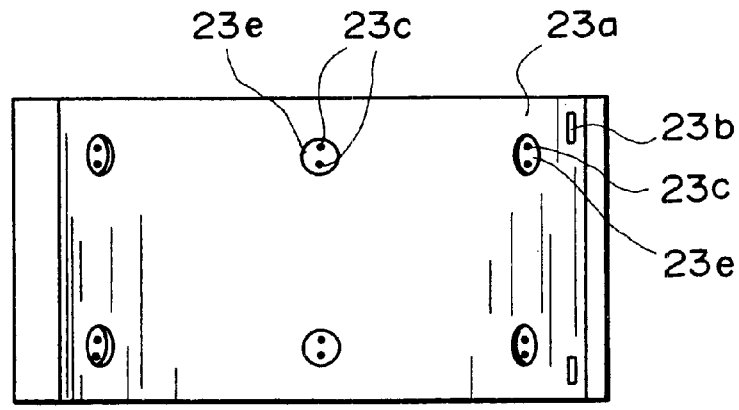

The recess 23e need not be limited to be X-shaped but may be variously shaped. For example, the recess 23e may be like a groove as shown in FIG. 6A or like a recessed seat as shown in FIG. 6A. Further, a plurality of suction holes 23c may be formed in one recess.

Figure 7A:
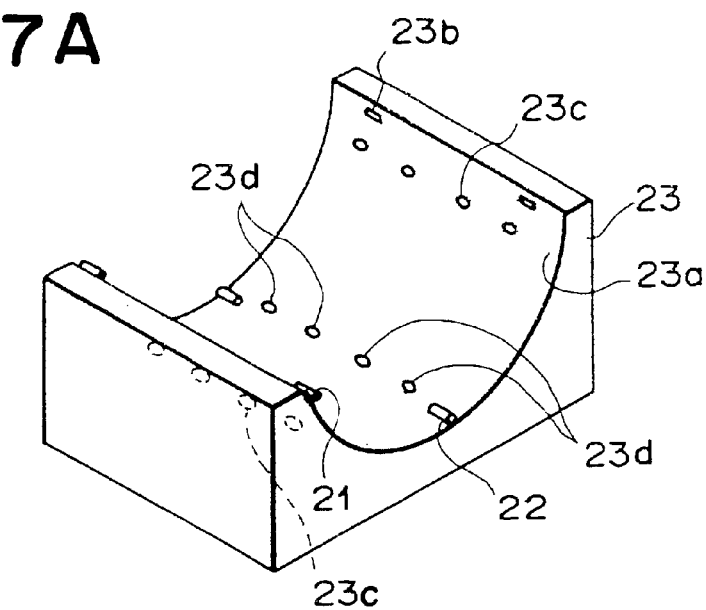
FIG. 7A is a perspective view of a sheet holding device in accordance with a second embodiment of the present invention.
Figure 7B:
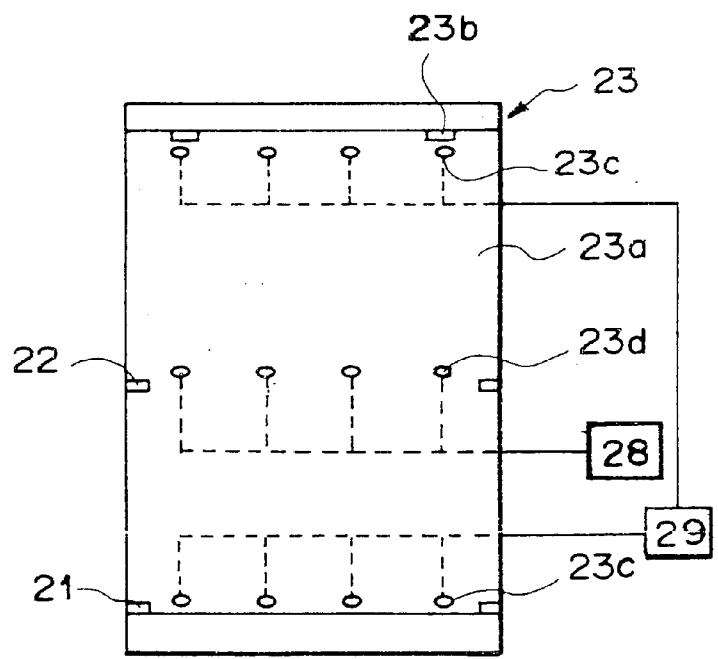
FIG. 7B is a plan view of the same.

A sheet holding device in accordance with a second embodiment of the present invention will be described with reference to FIGS. 7A and 7B, hereinbelow. The sheet holding device of this embodiment is substantially the same as that employed in the sheet conveying system of the first embodiment, and accordingly, the elements analogous to those shown in FIGS. 1A and 1B are given the same reference numerals and will not be described here.

The sheet holding device of this embodiment mainly differs from that employed in the sheet conveying system of the first embodiment in control of the suction pump 29. Accordingly, control of the suction pump 29 by the controller 27 will be only described here.

That is, after the trailing end pressing lever 25 is stopped on the rear edge of the sheet holding surface 23a, the controller 27 drives the suction pump 29 to apply suction force first to the suction holes 23c near to the leading end 10a of the sheet 10 and then to the suction holes 23c near to the trailing end 10b of the sheet 10.

With this arrangement, since the sheet 10 is attracted to the sheet holding surface 23a from the leading end 10a thereof toward the trailing end 10b thereof, air between the sheet 10 and the sheet holding surface 23a is gradually pushed toward the trailing end 10b of the sheet 10 and purged through the sides and/or the trailing edge of the sheet 10, whereby air cannot be trapped between the sheet 10 and the sheet holding surface 23a and the sheet 10 can be held in a close contact with the sheet holding surface 23a over the entire area thereof without any part held away from the sheet holding surface 23a.

Figure 8A:
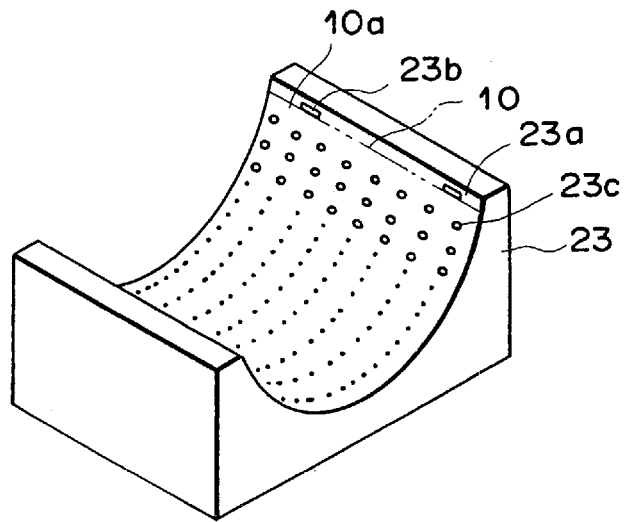
FIGS. 8A and 8B are views for illustrating a preferred arrangement of the suction holes.
Figure 8B:
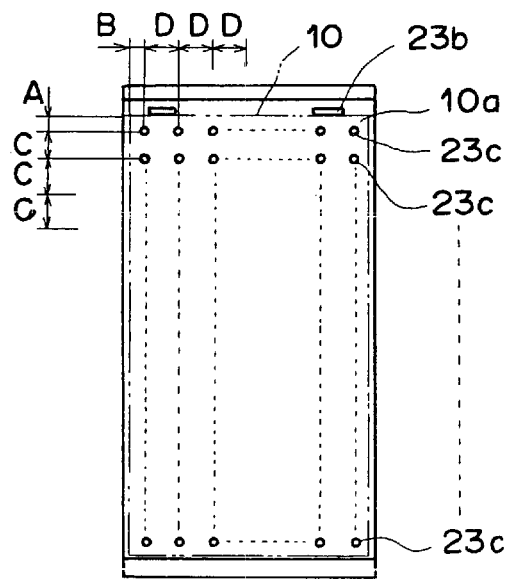

As shown in FIGS. 8A and 8B, the suction holes 23c are formed in the sheet holding surface 23a from a position at a distance of A from the leading end 10a of the sheet 10 and at a pitch of C in the direction of conveyance of the sheet 10 and from a position at a distance of B from the side edge of the sheet 10 and at a pitch of D in the direction perpendicular to direction of conveyance of the sheet 10. When the sucking performance of the suction pump 29 is 40L/min, the distances A and B are preferably 6 to 10mm, and most preferably 8mm, and the pitches C and D are preferably 25 to 35mm and most preferably 30mm.

In addition, all of the contents of Japanese Patent Application Nos. 11(1999)-250447, 11(1999)-250448 and 11(1999)-250449 are incorporated into this specification by reference.

What is claimed is:

1. A method conveying a sheet to be scanned to a sheet holding device provided with a support member having an arcuate and concave sheet holding surface and a sheet holding means for holding the sheet on the sheet holding surface in which the sheet is conveyed along the sheet holding surface in a circumferential direction thereof and is positioned in a predetermined position on the sheet holding surface, wherein the improvement comprises the steps of, blowing gas between the sheet holding surface and the sheet when the sheet is conveyed to and out of the predetermined position on the sheet holding device through a gas blow hole formed in the sheet holding surface; and stopping the blowing of gas when the sheet is in the predetermined position.

2. A system for conveying a sheet to be scanned to a sheet holding device provided with a support member having an arcuate and concave sheet holding surface and a sheet holding means for holding the sheet on the sheet holding surface, the system comprising conveyor means for conveying the sheet along the sheet holding surface in a circumferential direction thereof and a positioning means for positioning the sheet in a predetermined position on the sheet holding surface, wherein the improvement comprises:

a gas blow hole formed in the sheet holding surface, and a gas blow means with blows gas between the sheet holding surface and the sheet when the sheet is conveyed to and out of the predetermined position on the sheet holding device, and does not blow gas while the sheet is in the predetermined position, through the gas blow hole.

3. The system of claim 2, further comprising:

a groove formed in said sheet holding surface, wherein said groove has no outer edge extending in a direction perpendicular to the circumferential direction of the sheet holding surface.

4. The system of claim 3, wherein said groove has a suction hole formed therein, and wherein said sheet holding means comprises a suction means which supplies suction through said suction hole and said groove to hold the sheet on said sheet holding surface under vacuum.

5. The system of claim 4, wherein said groove is X-shaped.

6. A sheet holding device comprising:

a support member having an arcuate and concave sheet holding surface provided with a suction hole and a suction means which supplies suction force through a suction hole to hold the sheet on the sheet holding surface under vacuum;

at least one X-shaped groove formed in the sheet holding surface; and a suction hole formed in the X-shaped groove.

7. A method of conveying a sheet comprising:

a support member having a sheet holding surface; and conveying the sheet along said sheet holding surface while blowing gas between said sheet holding surface and said sheet through a gas blow hole formed in said sheet wherein said blowing is performed until said sheet has reached a predetermined position on said sheet holding surface.

8. A method as claimed in claim 7, wherein said sheet holding surface is arcuate and concave.

9. A method as claimed in claim 7, wherein said sheet is conveyed along said sheet holding surface in a circumferential direction, thereof.

10. A method as claimed in claim 7, further comprising stopping the blowing of said gas once said sheet has reached said predetermined position on said sheet holding surface.

11. A system for positioning a sheet to be scanned comprising:

a sheet holding device provided with a support member and a sheet holding surface;

a conveyor means for conveying the sheet along said sheet holding surface to a predetermined position on said sheet holding surface;

a gas blowing means for blowing gas between said sheet holding surface and the sheet while the sheet is conveyed to and out of said predetermined position on said sheet holding surface through at least one gas blow hole in said sheet holding surface; and a groove disposed in said sheet holding surface and which supplies suction to hold the sheet on said sheet holding surface under vacuum.

12. The system of claim 11, wherein said groove has no outer edge extending in a direction perpendicular to a conveying direction of the sheet along a circumferential direction of said sheet holding surface.

13. The system of claim 11, wherein said groove is X-shaped.

* * * * *